(12) United States Patent
Noguchi et al.

(10) Patent No.: US 10,719,201 B2
(45) Date of Patent: Jul. 21, 2020

(54) WRITING SYSTEM, INFORMATION PROCESSING APPARATUS, AND NON-TRANSITORY COMPUTER READABLE MEDIUM FOR DIVIDING WRITING INFORMATION ASSOCIATED WITH AN IDENTIFIED SHEET INTO SEPARATE DOCUMENTS BASED ON TIMING INFORMATION

(71) Applicant: FUJI XEROX CO., LTD., Tokyo (JP)

(72) Inventors: Takeshi Noguchi, Kanagawa (JP); Shunji Sakai, Kanagawa (JP); Takeshi Chiba, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 483 days.

(21) Appl. No.: 15/369,010

(22) Filed: Dec. 5, 2016

(65) Prior Publication Data
US 2017/0344206 A1 Nov. 30, 2017

(30) Foreign Application Priority Data
May 31, 2016 (JP) .................................. 2016-108853

(51) Int. Cl.
*G06F 3/0483* (2013.01)
*G06F 3/0481* (2013.01)
(Continued)

(52) U.S. Cl.
CPC .......... *G06F 3/0483* (2013.01); *G06F 3/0481* (2013.01); *G06F 3/0482* (2013.01);
(Continued)

(58) Field of Classification Search
CPC .. G06F 3/0483; G06F 3/04847; G06F 3/0482; G06F 3/0481; G06F 3/03545; G06F 17/242; G06F 17/217
See application file for complete search history.

(56) References Cited

U.S. PATENT DOCUMENTS

| 7,739,622 B2 * | 6/2010 | DeLine | G06F 3/0483 345/660 |
| 2004/0217947 A1 * | 11/2004 | Fitzmaurice | G06F 3/0481 345/183 |

(Continued)

FOREIGN PATENT DOCUMENTS

| JP | 2000-207129 A | 7/2000 |
| JP | 4137566 B2 | 8/2008 |
| JP | 5760887 B2 | 8/2015 |

OTHER PUBLICATIONS

Dec. 24, 2019 Office Action issued in Japanese Patent Application No. 2016-108853.

*Primary Examiner* — Nicholas Klicos
(74) *Attorney, Agent, or Firm* — Oliff PLC

(57) ABSTRACT

A non-transitory computer readable medium stores a program causing a computer to execute a process. The process includes: obtaining plural items of writing information including writing position information and writing timing information, each of the plural items of writing information being associated with one page of one document; displaying an image in accordance with plural items of writing information associated with an identical page among the obtained plural items of writing information; receiving a specified writing timing; updating a display mode of the displayed image in accordance with the received writing timing; and changing an association between at least one of the plural items of writing information corresponding to the displayed image and a document, based on the received writing timing.

10 Claims, 19 Drawing Sheets

(51) Int. Cl.
*G06F 3/0482* (2013.01)
*G06F 3/0484* (2013.01)
*G06F 40/114* (2020.01)
*G06F 40/171* (2020.01)
*G06F 3/0354* (2013.01)

(52) U.S. Cl.
CPC ........ *G06F 3/04847* (2013.01); *G06F 40/114* (2020.01); *G06F 40/171* (2020.01); *G06F 3/03545* (2013.01)

(56) References Cited

U.S. PATENT DOCUMENTS

| | | | | |
|---|---|---|---|---|
| 2006/0114488 | A1* | 6/2006 | Motamed | H04N 1/00384 358/1.13 |
| 2009/0300554 | A1* | 12/2009 | Kallinen | G06F 3/04883 715/863 |
| 2010/0115450 | A1* | 5/2010 | Scott | G06F 3/0483 715/777 |
| 2012/0096396 | A1* | 4/2012 | Ording | G06F 3/0481 715/799 |
| 2013/0229332 | A1* | 9/2013 | Barrus | G06K 9/2081 345/156 |
| 2014/0300629 | A1* | 10/2014 | Yokoyama | G06K 9/00416 345/619 |
| 2014/0363082 | A1* | 12/2014 | Dixon | G06K 9/00402 382/187 |
| 2015/0104778 | A1* | 4/2015 | Liu | G09B 7/04 434/335 |
| 2015/0116283 | A1* | 4/2015 | Black | G06K 9/00416 345/179 |
| 2015/0149894 | A1* | 5/2015 | Zhang | G06F 3/04842 715/268 |
| 2016/0117548 | A1* | 4/2016 | Hirakawa | G06K 9/00402 382/187 |
| 2016/0321025 | A1* | 11/2016 | Ikeda | G06F 3/0488 |
| 2016/0321029 | A1* | 11/2016 | Zhang | G06F 3/165 |
| 2017/0060406 | A1* | 3/2017 | Rucine | G06F 3/0236 |

* cited by examiner

STR1: {Σ (x,y),[t1,t2],p1}

STR2: {Σ (x,y),[t3,t4],p1}

STR3: {Σ (x,y),[t5,t6],p1}

STR4: {Σ (x,y),[t7,t8],p1}

STR5: {Σ (x,y),[t9,t10],p1}

FIG. 5

| DOCUMENT ID | PAGE ID | STROKE ID(s) |
| --- | --- | --- |
| DOCUMENT A-1 | DOCUMENT A-1-p1 | |
| | DOCUMENT A-1-p2 | STR18 |
| | DOCUMENT A-1-p3 | |
| DOCUMENT A-2 | DOCUMENT A-2-p1 | STR1,STR2,STR3,⋯STR12, STR13,⋯STR17 |
| | DOCUMENT A-2-p2 | STR19 |
| | DOCUMENT A-2-p3 | |
| DOCUMENT A-3 | DOCUMENT A-3-p1 | STR20 |
| | DOCUMENT A-3-p2 | |
| | DOCUMENT A-3-p3 | STR21 |
| ⋯ | ⋯ | ⋯ |

FIG. 13

| DOCUMENT ID | PAGE ID | STROKE ID(s) |
|---|---|---|
| DOCUMENT A-1 | DOCUMENT A-1-p1 | STR1,STR2,STR3,⋯STR12 |
| | DOCUMENT A-1-p2 | STR18 |
| | DOCUMENT A-1-p3 | |
| DOCUMENT A-2 | DOCUMENT A-2-p1 | STR13,STR14,STR15, STR16,STR17 |
| | DOCUMENT A-2-p2 | STR19 |
| | DOCUMENT A-2-p3 | |
| DOCUMENT A-3 | DOCUMENT A-3-p1 | STR20 |
| | DOCUMENT A-3-p2 | |
| | DOCUMENT A-3-p3 | STR21 |
| ⋯ | ⋯ | ⋯ |

FIG. 16

| DOCUMENT ID | PAGE ID | STROKE ID(s) |
|---|---|---|
| DOCUMENT A-1 | DOCUMENT A-1-p1 | STR1,STR2,STR3,···STR12 |
| | DOCUMENT A-1-p2 | STR18 |
| | DOCUMENT A-1-p3 | |
| DOCUMENT A-2 | DOCUMENT A-2-p1 | STR13,STR14,STR15, STR16,STR17,STR20 |
| | DOCUMENT A-2-p2 | STR19 |
| | DOCUMENT A-2-p3 | |
| DOCUMENT A-3 | DOCUMENT A-3-p1 | |
| | DOCUMENT A-3-p2 | |
| | DOCUMENT A-3-p3 | STR21 |
| ··· | ··· | ··· |

WRITING SYSTEM, INFORMATION PROCESSING APPARATUS, AND NON-TRANSITORY COMPUTER READABLE MEDIUM FOR DIVIDING WRITING INFORMATION ASSOCIATED WITH AN IDENTIFIED SHEET INTO SEPARATE DOCUMENTS BASED ON TIMING INFORMATION

CROSS-REFERENCE TO RELATED APPLICATIONS

This application is based on and claims priority under 35 USC 119 from Japanese Patent Application No. 2016-108853 filed May 31, 2016.

BACKGROUND

(i) Technical Field

The present invention relates to a writing system, an information processing apparatus, and a non-transitory computer readable medium.

(ii) Related Art

A technology for writing on special sheets by using an information reading device called a digital pen and forming the content of writing into data is available. Typically, one document is constituted by plural pages, and thus, each special sheet is appended with page number information. As a result of reading this page number information together with the content of writing, page information indicating the association between writing data and pages is recorded.

If unique page numbers are provided to all special sheets, page numbers are infinitely increased, which makes the manufacturing and management of special sheets cumbersome. In view of this point, a technique for recording all documents by using one set of special sheets appended with identification (ID) information for a predetermined number of pages (for example, ten pages) is available. In this technique, after the completion of writing of one document, a user performs a predetermined operation with a pen to add information indicating the end of the document to the generated writing data. In this manner, a page and documents belonging to this page are associated with each other, thereby making it possible to generate data concerning various documents by using a limited number of special sheets.

SUMMARY

If the user forgets to input information indicating the end of a document, the generated writing data does not indicate the correct association between documents and pages as intended by the user. In this case, the user is required to edit writing data by using an information processing apparatus. More specifically, the user checks on a screen the content of writing reproduced based on the writing data, specifies an incorrectly associated portion of the writing data, and then associates the specified portion with a correct document.

FIG. 19 schematically illustrates this editing operation. In FIG. 19, the user recognizes that three different documents are created by using one set of three special sheets appended with unique IDs. More specifically, a set of documents including a document A-1 constituted by three pages on which characters "あいう", "かきく", and "さしす" are respectively written, a document A-2 constituted by three pages on which characters "AB", "CD", and "EF" are respectively written, and a document A-3 constituted by three pages on which numbers "111", "222", and "333" are respectively written is formed. In fact, however, the user has forgotten to input information indicating the ends of the documents. As a result, the three documents are recognized as one document by the information processing apparatus such that "あいう", "AB", and "111" are superposed on each other on the first page.

The user then specifies portions to be corrected by the information processing apparatus while seeing images indicating the reproduced content of writing. Usually, writing information concerning one page is constituted by many items of data which are the minimum units that can be edited, though it depends on the amount of writing. It thus takes time and efforts to specify items of data to be corrected for the association between these items of data and documents from many items of data.

According to an aspect of the invention, there is provided a non-transitory computer readable medium storing a program causing a computer to execute a process. The process includes: obtaining plural items of writing information including writing position information and writing timing information, each of the plural items of writing information being associated with one page of one document; displaying an image in accordance with plural items of writing information associated with an identical page among the obtained plural items of writing information; receiving a specified writing timing; updating a display mode of the displayed image in accordance with the received writing timing; and changing an association between at least one of the plural items of writing information corresponding to the displayed image and a document, based on the received writing timing.

BRIEF DESCRIPTION OF THE DRAWINGS

Exemplary embodiments of the present invention will be described in detail based on the following figures, wherein:

FIG. 5 is a table illustrating an example of the data structure;

FIG. 13 is a table illustrating data after editing;

FIG. 16 is a table illustrating data after editing;

DETAILED DESCRIPTION

Figure 1:
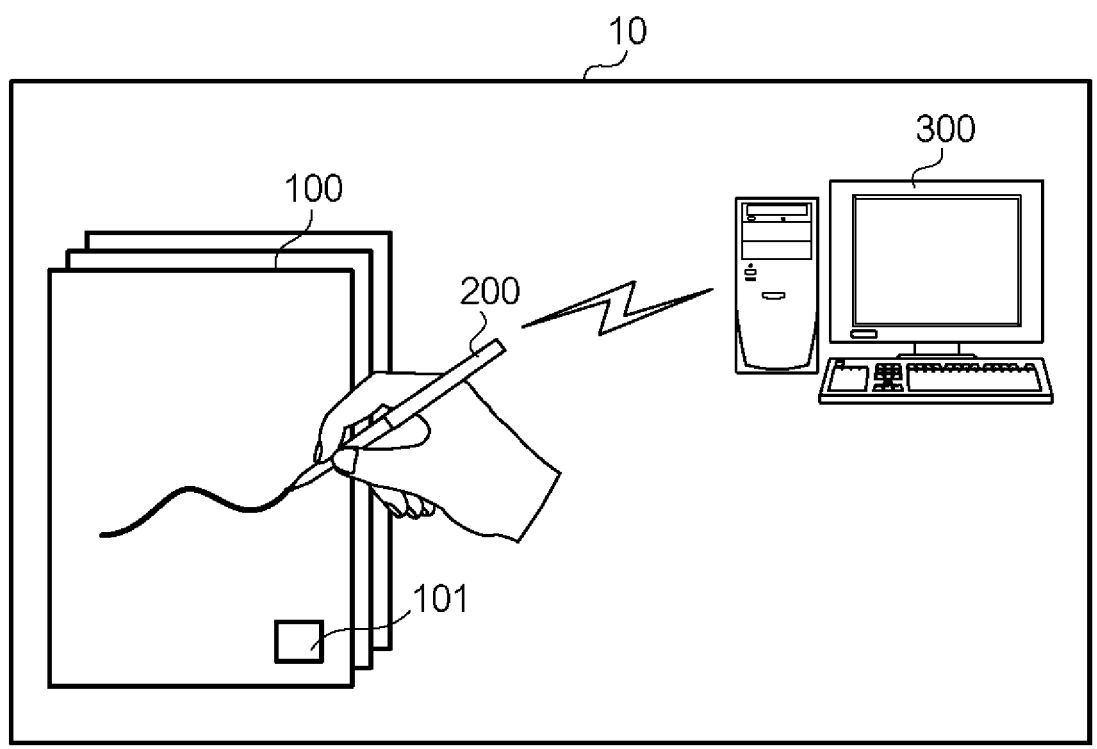
FIG. 1 is a schematic view illustrating a writing system.

FIG. 1 schematically illustrates a writing system 10. The writing system 10 includes sheets 100, a digital pen 200, and an information processing apparatus 300. The sheets 100 are special sheets on which a user can write. The sheets 100 are made of paper or plastic, for example. The digital pen 200 also serves as an ordinary writing material used by a user. The information processing apparatus 300 performs editing for data indicating the content of writing performed by the user using the digital pen 200. The writer and the editor are not necessarily the same user.

The sheets 100 are constituted by plural sheets (for example, ten sheets). On each sheet 100, codes (not shown) indicating the positions on a sheet 100 are printed in a mode in which they are invisible or are difficult to identify by the writer. Information formed on each sheet 100 contains information concerning a unique page number. An area 101 is provided on each page to record information indicating the completion of input of a document into the digital pen 200. A user brings the digital pen 200 into contact with the area 101, and then, information indicating the completion of input of a document is generated in the digital pen 200. If the user forgets to perform this operation, the generate data does not indicate the correct association between documents and pages as intended by the user.

Figure 2:
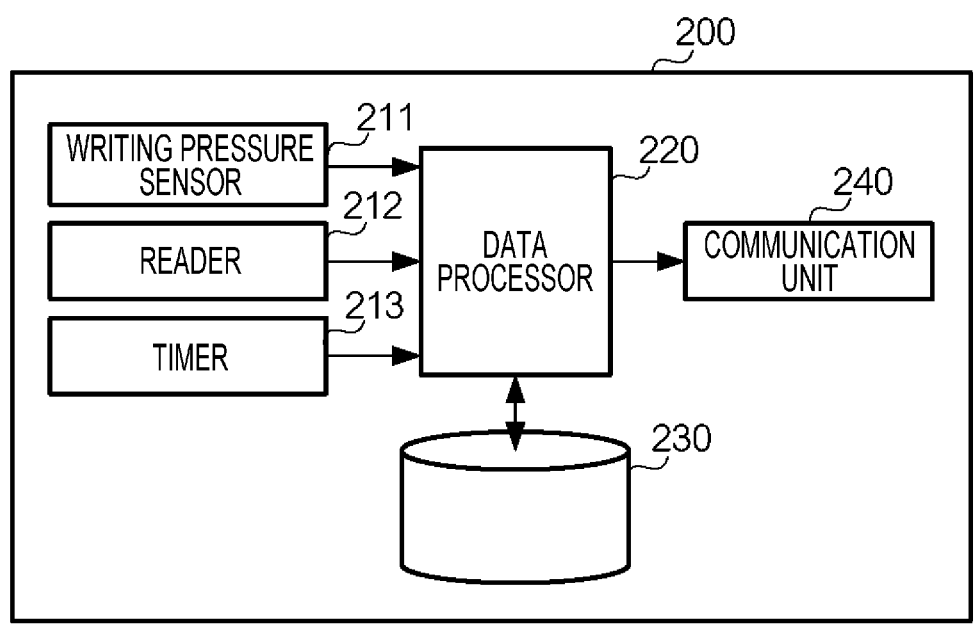
FIG. 2 is a functional block diagram of a digital pen.

FIG. 2 illustrates the functions of the digital pen 200. The digital pen 200 includes a grip, a pen nib, a pen holder, and an ink storage portion, and serves as an ordinary writing material. The digital pen 200 also includes an electronic device for generating writing information. More specifically, the digital pen 200 includes a writing pressure sensor 211, a reader 212, a timer 213, a data processor 220, a storage unit 230, and a communication unit 240. The writing pressure sensor 211 is a contact sensor that detects contact with a sheet 100 and determines whether writing is being performed. The reader 212 includes light-emitting elements and light-receiving elements, and optically reads position information (coordinates) formed on the sheet 100, page information, and other items of information. The timer 213 calculates a timing at which writing is performed.

The data processor 220 generates stroke information STR based on information supplied from the writing pressure sensor 211, the reader 212, and the timer 213. One item of stroke information STR at least includes a path (a set of coordinates) of writing positions during a period from when the writing pressure sensor 211 turns ON until when it turns OFF, information indicating the writing timing (writing start time and end time), and page information indicating a page on which writing is performed. The stroke information STR may also include information concerning the writing mode such as the type and the thickness of the digital pen 200.

FIG. 5 illustrates a table indicating an example of the association between the content of writing and generated stroke information STR. If characters "A", "B", and "C" are sequentially written on a page represented by "p1", five items of stroke information STR1, STR2, STR3, STR4, and STR5 are generated. That is, one stroke is the smallest unit for data indicating the content of writing and is also the minimum unit for editing processing.

The storage unit 230 is a semiconductor memory, for example, and successively stores stroke information STR generated by the data processor 220. The communication unit 240 is implemented as a wireless communication unit, such as Bluetooth (registered trademark), or a wired communication unit, such as a universal serial bus (USB), and sends a set of stroke information STR constituted by plural items of stroke information STR at a predetermined timing.

Figure 4:
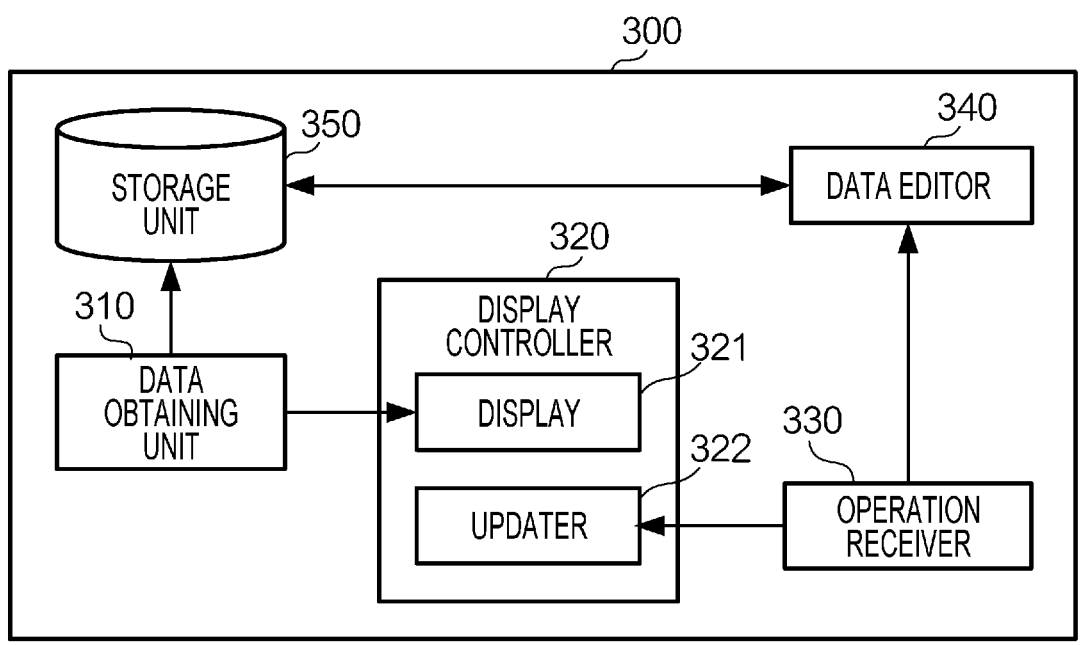
FIG. 4 is a functional block diagram of an information processing apparatus.

FIG. 4 illustrates the functions of the information processing apparatus 300. The information processing apparatus 300 is a general-purpose information processing apparatus, such as a personal computer, having various functions achieved as a result of executing software. The information processing apparatus 300 includes a data obtaining unit 310, a display controller 320, an operation receiver 330, a data editor 340, and a storage unit 350.

The data obtaining unit 310 receives stroke information STR from the digital pen 200 by a wireless communication unit, such as Bluetooth. The display controller 320 is implemented as a liquid crystal display and a display control processor as a result of a processor (central processing unit (CPU)) executing an editing application. The display controller 320 generates screen data based on the stroke information STR received from the digital pen 200 and displays a screen. The operation receiver 330 is an input device, such as a mouse, a keyboard, and a touch panel, and receives an instruction from a user, and more specifically, receives a writing timing specified by the user.

The data editor 340, which is a processor, edits stroke information STR based on an instruction received by the operation receiver 330. More specifically, based on the timing received by the operation receiver 330, the data editor 340 changes the association between at least one of plural items of writing information corresponding to the displayed image and a document. That is, the data editor 340 has a function of dividing a set of stroke information STR at a writing timing specified by the user. More specifically, among plural items of writing information to which the same page information is appended, the data editor 340 associates first writing information indicating a writing timing prior to the specified writing timing and second writing information indicating a writing timing subsequent to the specified writing timing with different documents. The data editor 340 also has a function of merging two items of stroke information STR. More specifically, the data editor 340 associates two items of stroke information STR associated with the same page of different documents with the same page of the same document.

That is, the writing timing specified by the user determines the editing content of stroke information STR. The editing content includes processing for "dividing" or "merging" data. Hereinafter, the writing timing specified by the user for specifying data to which timing information is appended may be called "dividing point".

The storage unit 350, which is a hard disk, stores an operating system (OS) and an application program for editing stroke information STR, and also stores stroke information STR received from the digital pen 200 and stroke information edited by the data editor 340. The application program is provided as a result of being stored in a storage medium or being downloaded via a network.

The display controller 320 is implemented as an image processor, and includes a display 321 and an updater 322. The display 321 displays an image in accordance with at least plural items of writing information associated with the same page among the obtained plural items of writing information. The updater 322 updates the display mode of the screen by successively reflecting instructions received by the operation receiver 330. The display mode includes the color, type, and thickness of strokes, animation, effects (blinking), and other visual effects. In short, the display mode indicates any visual effects that may assist the user in understanding the content of writing corresponding to the specified writing timing.

The display 321 displays for each page images corresponding to items of stroke information STR to which the same page information is appended. In this case, the display 321 displays each image at positions corresponding to the actual writing positions within one page. The display 321 also displays a guiding image representing sequential writing timings corresponding to the items of writing information in chronological order. The operation receiver 330 receives an operation for specifying a position within the guiding image. In this case, within the guiding image, periods for which writing is performed and periods for which writing is not performed may separately be displayed. The display 321 may also display an image for instructing the user to specify the longest period for which writing is not performed.

Figure 6:
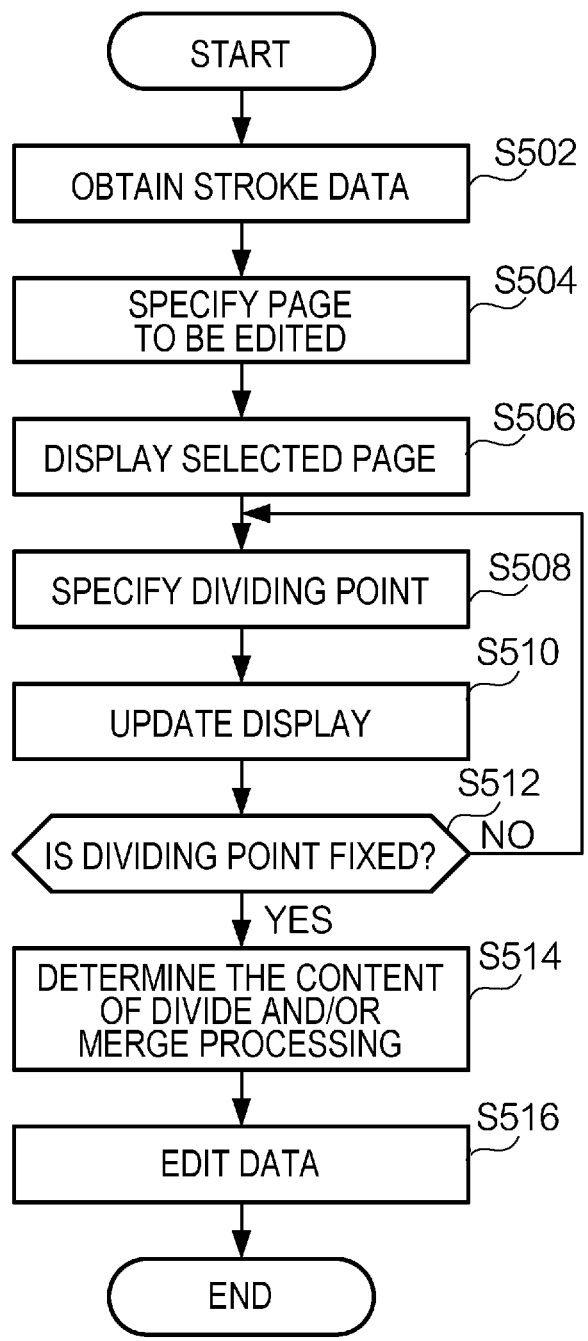
FIG. 6 is a flowchart illustrating an example of the operation performed by the information processing apparatus.

FIG. 6 is a flowchart illustrating an overview of an example of the operation performed by the information processing apparatus 300. In step S502, the user performs predetermined processing to start an editing application for editing stroke information STR, and obtains stroke information STR from the digital pen 200. In step S504, the user selects a page to be edited. In step S506, the information processing apparatus 300 displays the selected page. In step S508, the user specifies a writing timing. In step S510, the information processing apparatus 300 successively updates the displayed mode of the display image in accordance with the writing timing specified by the user. If the user fixes the writing timing (YES in S512), the information processing apparatus 300 determines the content of divide processing and/or merge processing in step S514. Then, in step S516, the information processing apparatus 300 changes the association between at least one of the items of stroke information STR corresponding to the displayed image and the document, based on the fixed writing timing.

Each step in the above-described operation will be discussed below in detail.

Figure 7:
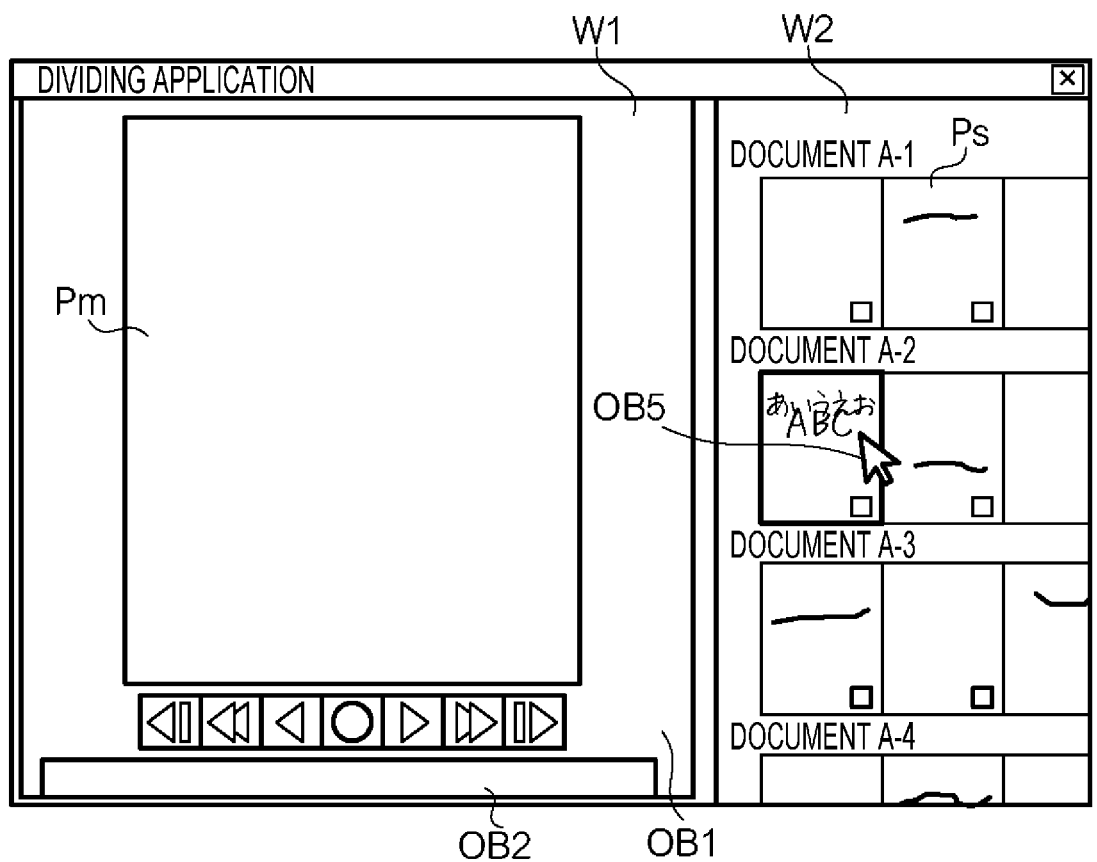
FIGS. 7 through 12 illustrate examples of screens according to an exemplary embodiment.

FIG. 7 illustrates an example of the screen displayed on the information processing apparatus 300 immediately after the user has obtained stroke information STR as a result of starting the editing application (S502). The display area of the screen is divided into windows W1 and W2. In the window W2, images Ps representing all the items of stroke information STR are displayed according to the page (thumbnail display) as a result of reproducing the content of writing according to page information. If the size of the window W2 is not sufficient to display all the documents, the user performs a scroll operation to change the subject page. In FIG. 7, the images Ps are displayed such that the writing content of the first page, that of the second page, that of the third page, and so on, are disposed for each of documents A-1, A-2, A-3, A-4, and so on.

In the window W1, an image Pm, which is an enlarged image of one page selected from the window W2 as a result of the user operating an object OB5, is displayed. In the window W1, objects OB1 and OB2 for displaying and specifying a dividing point are also displayed.

Figure 8:
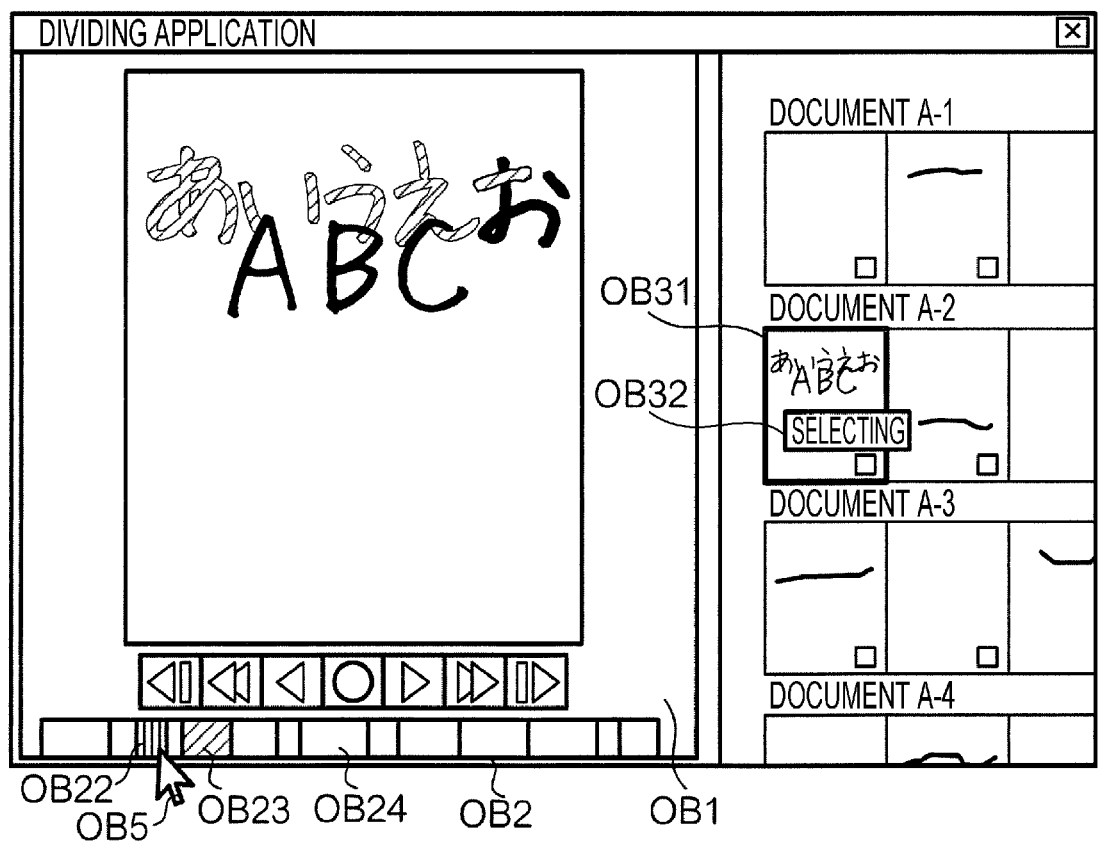

FIG. 8 illustrates an example of the screen displayed in step S504 of FIG. 6. The user first checks the images Ps displayed in the window W2 to determine whether the generated items of stroke information STR indicate the content of writing as intended by the user. In this example, the user determines that the image associated with the first page of the document A-2 does not indicate the content of writing as intended by the user. That is, the user recognizes that characters "あいうえお" and characters "ABC" overlap each other and identifies that these two kinds of characters have been recognized as the same page by the information processing apparatus 300 due to an inadvertent operation though they are supposed to be written on the first pages of different documents. The user then determines that the stroke information STR associated with this page needs editing.

The user first selects the first page of the document A-2 in the window W2. Then, the information processing apparatus 300 displays objects OB31 and OB32 indicating that this page is selected in the window W2, and also displays an enlarged image of this page in the window W1. The information processing apparatus 300 then extracts all items of stroke information STR associated with this page, and displays timing information in the object OB2 in association with the positions within the horizontal bar of the object OB2. Writing on this page starts at the time point corresponding to the left edge and finishes at the time point corresponding to the right edge of the horizontal bar of the object OB2. The horizontal positions within the object OB2 correspond to individual writing timings.

In the object OB2, a period for which writing is performed (that is, the digital pen 200 is in contact with a sheet 100) is represented by an object OB23, while a period for which writing is not performed (that is, the digital pen 200 is separated from a sheet 100) is represented by an object OB24. In this manner, in the object OB2, the period for which writing is performed and the period for which writing is not performed are separately displayed. This enables the user to intuitively understand the situation of the writing timing (time distribution) associated with this page and to determine candidates of a dividing point.

The position of the object OB5 indicates a dividing point. The user adjusts the timing by horizontally shifting the object OB5. Every time the position of the object OB5 is changed, the display mode of the image Pm is updated to allow the user to recognize the dividing point. In the example in FIG. 8, if characters are written in the order of "あ", "い", "う", "え", "お", "A", "B", and "C", the characters from "あ" to the first stroke of "お" are displayed in blue, while the characters from the second stroke of "お" to "C" are displayed in red.

In the initial state (the state in which the user has not specified the dividing point), the object OB5 is preferably located within the object OB24 indicating the longest (widest) period for which writing is not performed among the plural objects OB24. A longer period for which writing is not performed is more likely to be a period that contains a position at which the user has intended as the end of a document.

Figure 9:
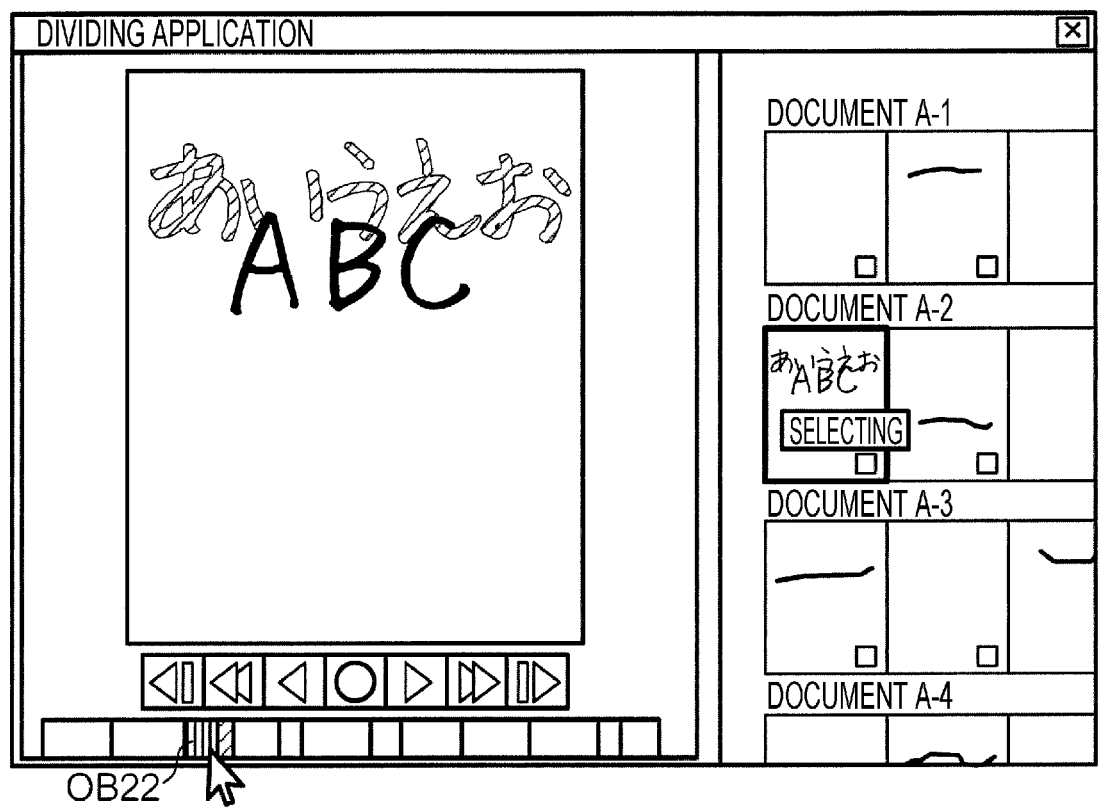

The user searches for the dividing point that matches the position intended by the user while moving the object OB5. The user determines that the user has written "ABC" as the document A-2 but "あいうえお" as the document A-1. Then, while seeing the image Pm, the user moves the object OB5 to a position between the third stroke of "お" and the first stroke of "A", as shown in FIG. 9. In this manner, in this exemplary embodiment, the position of the object OB5 is immediately reflected in the display mode, thereby making it easy for the user to specify the dividing point (steps S508 and S510 in FIG. 6).

Figure 10:
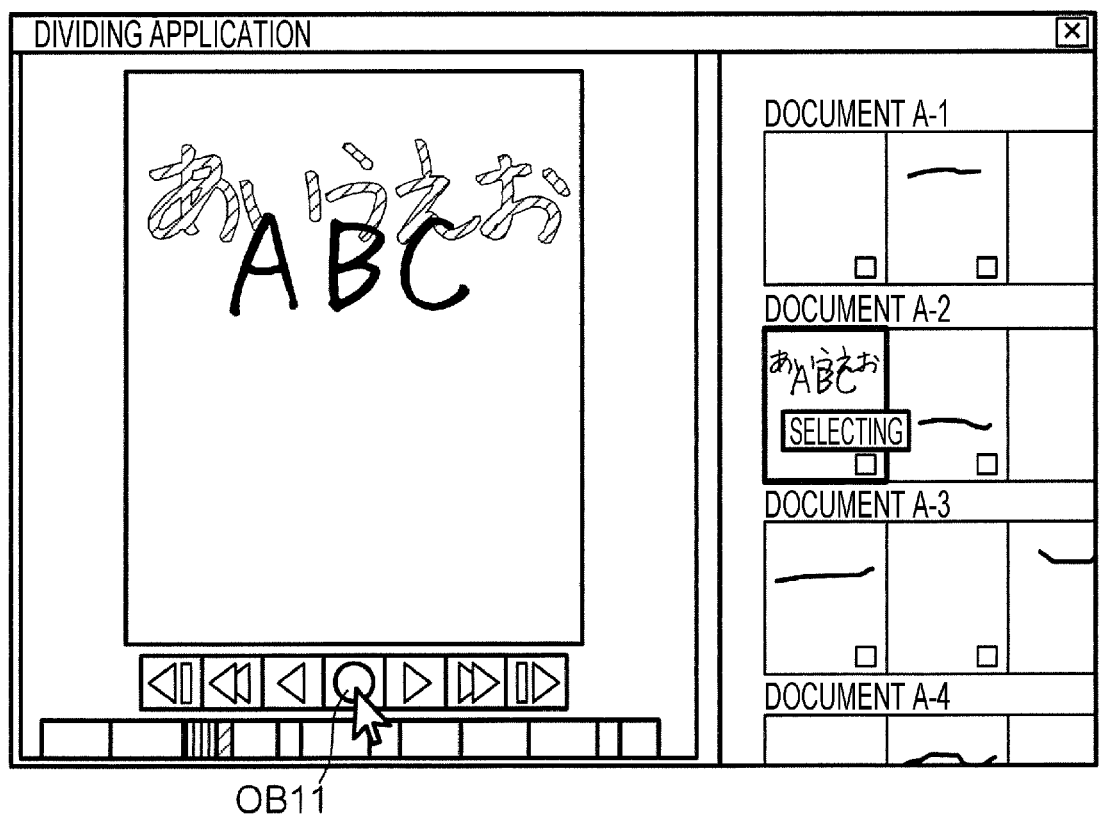

Then, if, as shown in FIG. 10, the user clicks an object OB11 in the state in which the object OB5 is at a position selected by the user, the information processing apparatus 300 fixes the writing timing (dividing point) (step S512 in FIG. 6).

Figure 11:
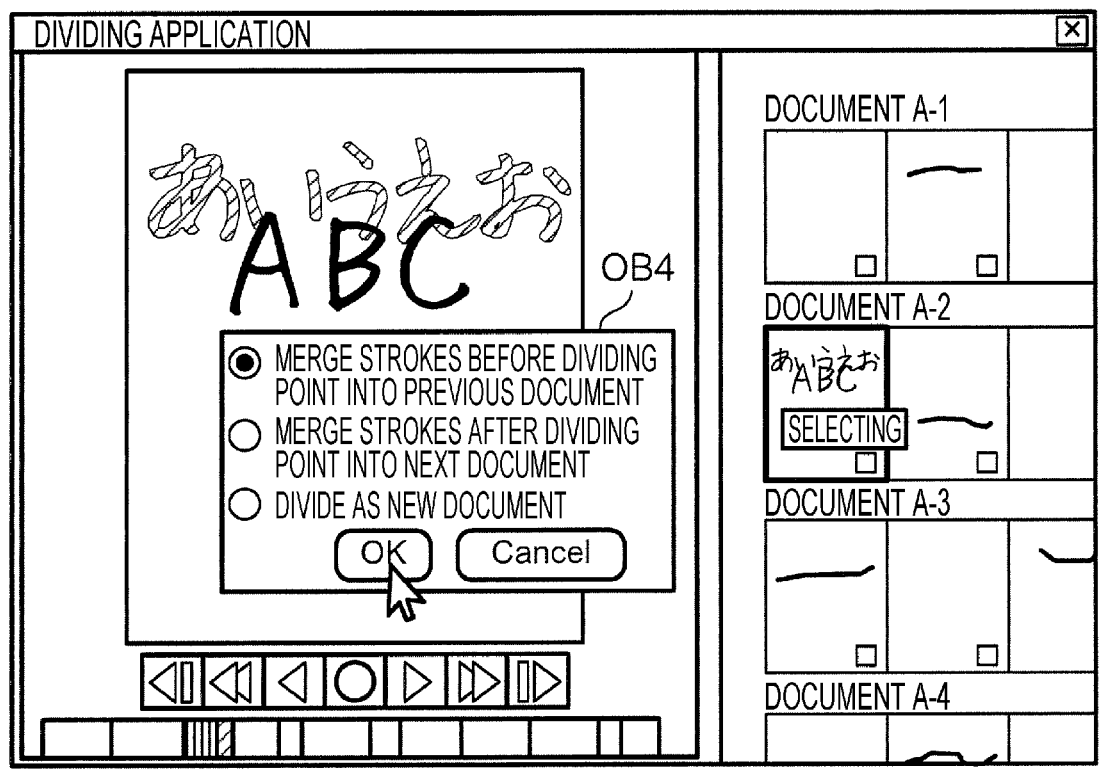

Then, the information processing apparatus 300 displays a dialog box object OB4 to instruct the user to input the content of editing, as shown in FIG. 11. More specifically, the information processing apparatus 300 instructs the user to select one of processing candidates: (a) the content of writing before the dividing point is merged into the temporally previous document (in this case, the document A-1); (b) the content of writing after the dividing point is merged into the temporally subsequent document (in this case, the document A-3); and (c) the content of writing before (or after) the dividing point is added as a new document.

If processing (a) is selected, a set of items of writing information corresponding to "あいうえお" is associated with the document A-1 (step S514 in FIG. 6). In accordance with this change, the images Pm and Ps are updated to those shown in FIG. 12, and the stroke information STR is updated, as shown in FIG. 13 (step S516 in FIG. 6). That is, the document associated with items of stroke information STR1 through STR12 corresponding to "あいうえお" is changed from the document A-2 to the document A-1 while the page information is being maintained.

If processing (b) is selected, the stroke information STR is edited and the screen is updated in accordance with the editing content specified by the user in a manner similar to processing (a). For example, if the document into which a set of writing information is merged is the document A-3, the document associated with items of stroke information STR13 through STR17 is changed from the document A-2 to the document A-3.

If processing (c) is selected, the user specifies the content of writing before and/or after the dividing point, and the specified set of writing information is associated with a new document A-(n+1).

Figure 12:
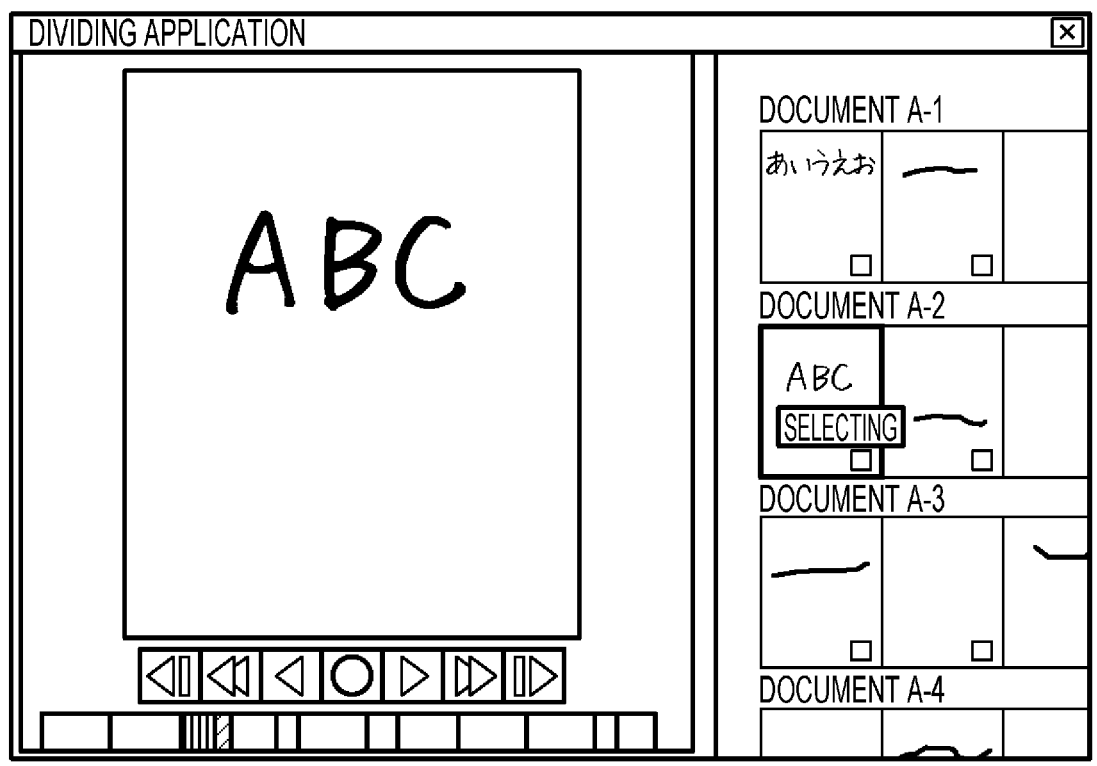
Figure 14:
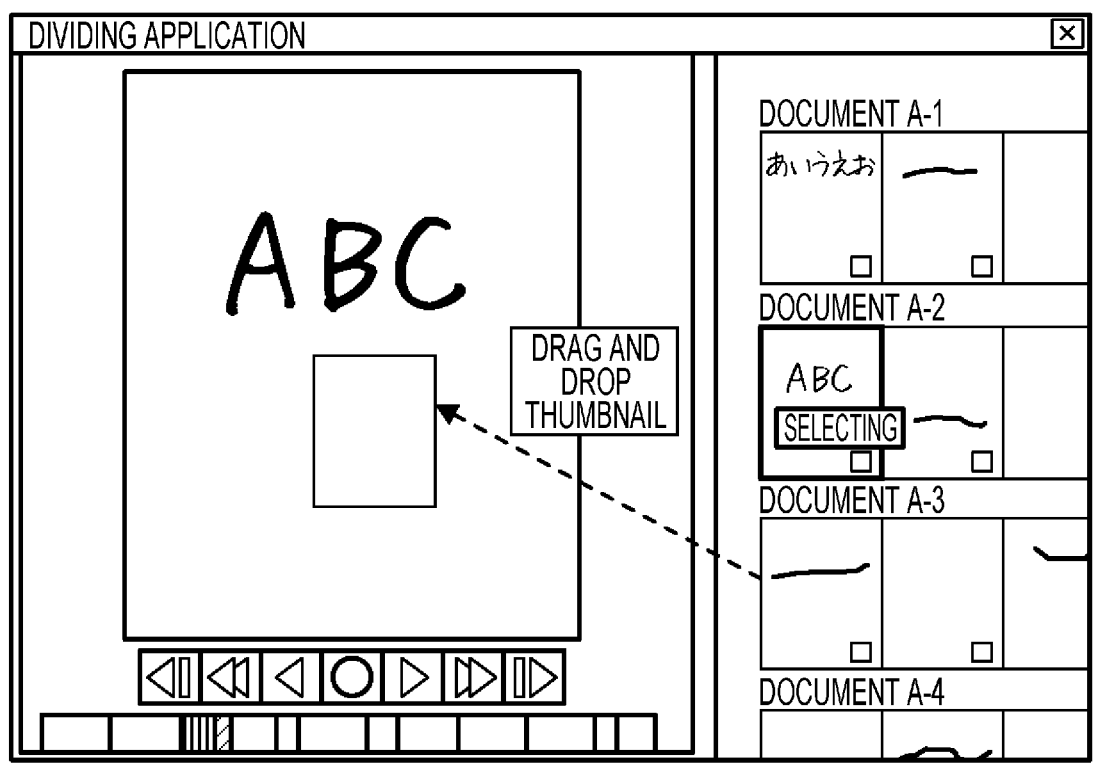
FIGS. 14 and 15 illustrate examples of screens.
Figure 15:
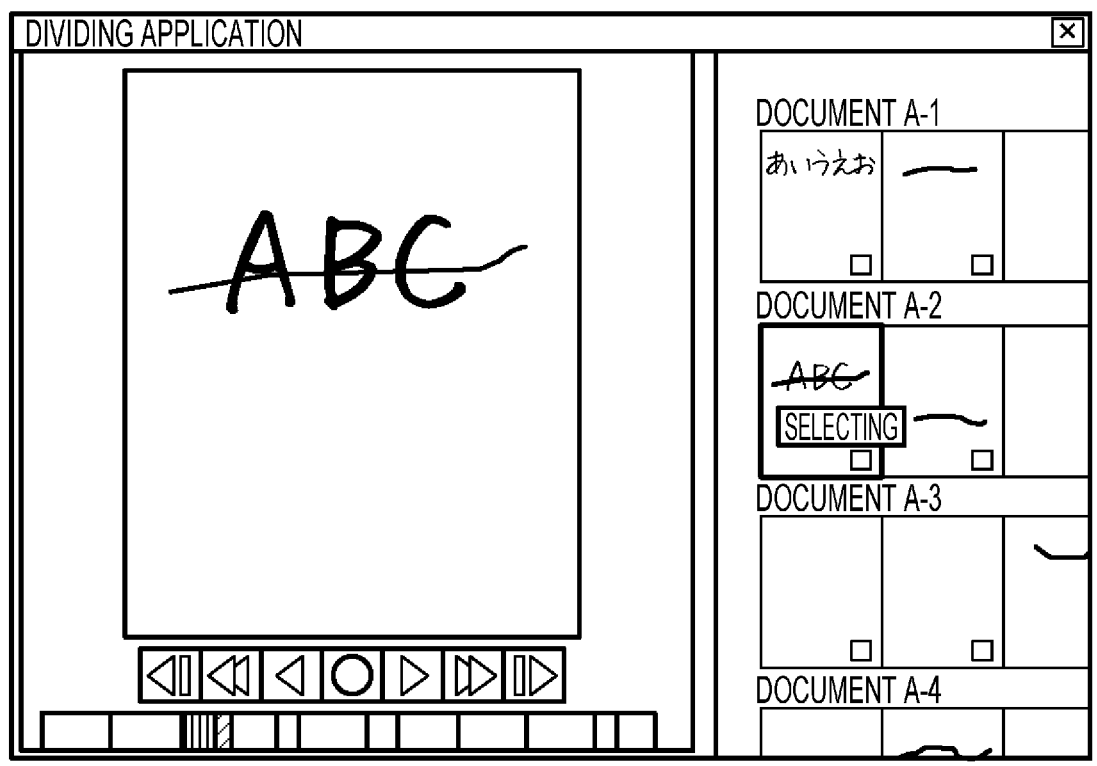

An example of editing to be performed from the state in which the screen in FIG. 12 is displayed will be discussed. The user checks the window W2 and identifies that the writing information of the first page of the document A-3 is supposed to be associated with the first page of the document A-2. In this case, the user first selects the page into which this writing information will be merged (in this case, the first page of the document A-2). The selected page is displayed in the window W1. The user then specifies the page to be merged into the first page of the document A-(in this case, the first page of the document A-3) and performs a drag-and-drop operation, as shown in FIG. 14. Then, the document associated with the entire writing information on the first page of the document A-3 is temporarily changed to the document A-2, and the image reflecting this change is displayed in the window W1, as shown in FIG. 15. In FIG. 15, "ABC" and the horizontal line are superposed on each other.

After checking this editing content, the user clicks the object OB11 (FIG. 10) to fix this change in the editing content. In the updated stroke information STR shown in FIG. 16, the stroke information STR20 corresponding to the horizontal line is associated with the document A-2. If only some of plural items of writing information are merged, the dividing point may be specified by using the object OB2 in a manner similar to that discussed with reference to FIGS. 8 through 10.

The object into which writing information will be merged is not restricted to another document of the same page, but may be a different page of another document. In this case, the information processing apparatus 300 overwrites the page information appended to the corresponding items of stroke information STR.

Other Exemplary Embodiments

Figure 17:
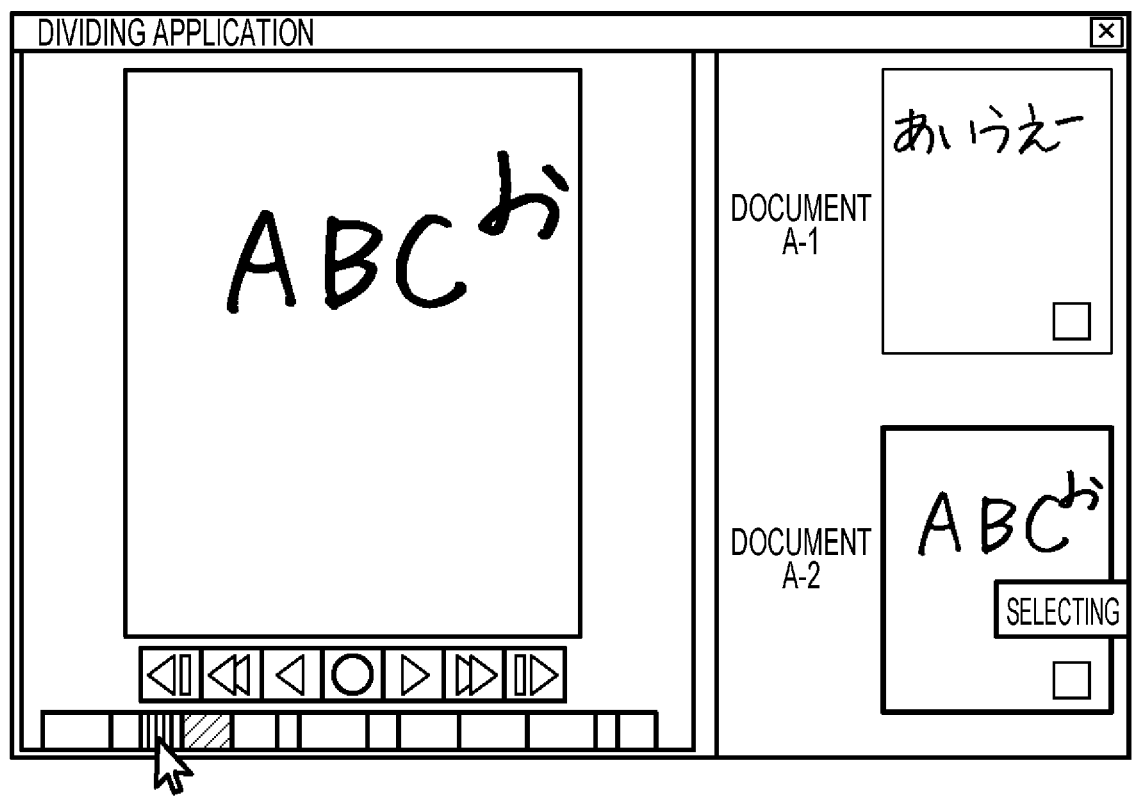
FIG. 17 illustrates an example of a screen according to another exemplary embodiment.

When the user selects one page, thumbnail images of only the selected page may be displayed in the window W2, as shown in FIG. 17. Without displaying the images Ps of the other pages, the images Ps of the selected page that may be related to editing can be displayed in a large size.

Figure 18:
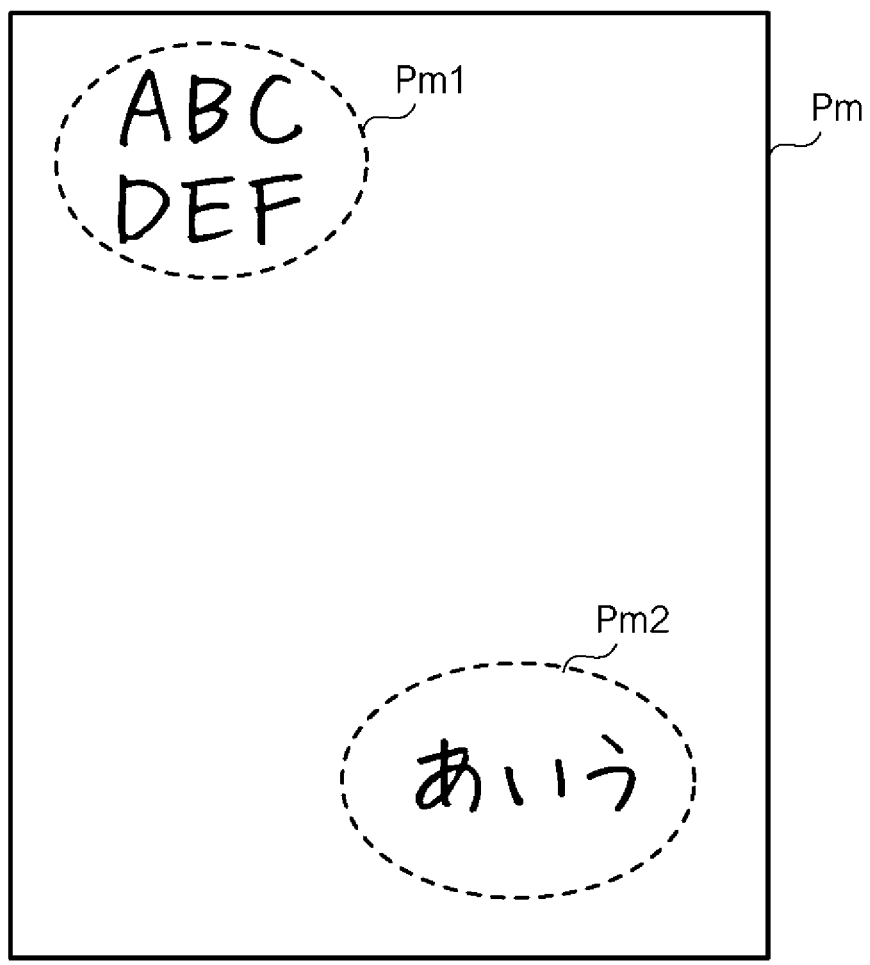
FIG. 18 illustrates processing according to another exemplary embodiment.
Figure 19:
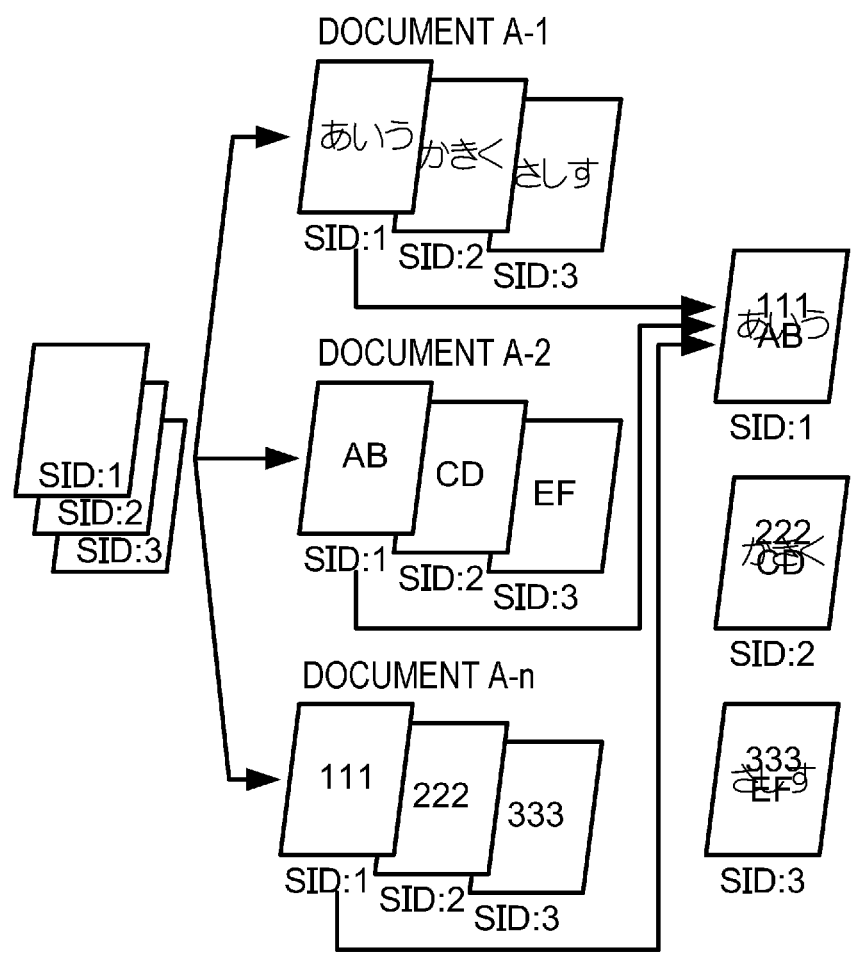
FIG. 19 schematically illustrates editing processing for writing data according to the related art.

The information processing apparatus 300 may include a position analyzer that analyzes the positions of written characters within a page. In this case, after a page to be edited is selected, the position analyzer may estimate a dividing point by analyzing the positions of the characters indicated by all items of stroke information STR corresponding to this page. Then, the information processing apparatus 300 automatically displays an object OB22 (FIGS. 8 and 9) at the estimated dividing point and also displays the image corresponding to this dividing point in the window W1. For example, as shown in FIG. 18, if the image Pm of the selected page includes portions Pm1 and Pm2, the position analyzer estimates that each of the portions Pm1 and Pm2 indicates a set of information which is unlikely to be divided and that a position somewhere between the end of the portion Pm1 and the start of the portion Pm2 (if some characters are written therebetween, a certain position therebetween) is the dividing point. If this estimated dividing point coincides with a dividing point selected by the user, the user merely presses a setting button to finish editing processing. In this method, an image with a dividing point that is easy to understand by a user is first displayed, and editing is performed after receiving an instruction from the user. With this method, it is less likely to determine a wrong dividing point than with the related art in which a dividing point is automatically determined only based on the positions of characters.

Figure 3:
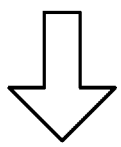
FIG. 3 illustrates the association between the content of writing and generated writing information.

All or some of the functions of the information processing apparatus 300 may be implemented by another device. For example, without providing the information processing apparatus 300, all the functions of the information processing apparatus 300 may be integrated into the digital pen 200. The format of stroke information STR, the approach to reading the coordinates, and the format of data generated in the digital pen 200 are not particularly restricted. For example, the relationship between characters and stroke information STR is not limited to the mode shown in FIG. 3. Instead, plural strokes corresponding to one character may be grouped and be handled as the minimum unit for editing processing. In short, as data subjected to information processing in an exemplary embodiment of the invention, any data indicating a set of writing information constituted by pairs of plural items of position information and plural items of timing information associated with page information may be used.

Information processing according to an exemplary embodiment of the invention includes: obtaining plural items of writing information including writing position information and writing timing information, each of the plural items of writing information being associated with one page of one document; receiving a specified writing timing; displaying an image in accordance with the obtained plural items of writing information in a mode reflecting the specified writing timing; and changing an association between at least one of the plural items of writing information corresponding to the displayed image and a document, based on the received writing timing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process, the process comprising:
   obtaining a plurality of items of writing information associated with a first document, of a plurality of documents, each item of writing information representing handwriting of a user and including writing position information and writing timing information, and each item of writing information being associated with one page, of a plurality of pages, of one document, of the plurality of documents;
   displaying: (i) a screen including a representation of the plurality of documents and respective pages of the plurality of documents; and (ii) an image including representations of all of the handwriting of the user represented by the plurality of items of writing information associated with the one page,
   wherein when the item of writing information on a first page of the plurality of pages is selected and dragged to a second page of the plurality of pages, the selected item of writing information is moved from the first page to the second page, both the first page and the second page being simultaneously visible within the screen;
   receiving a specified writing timing, the specified writing timing being a specific time;
   updating the displayed image to display the representations of the handwriting of the user represented by items of writing information that have writing timing information before the specified writing timing differently than the representations of the handwriting of the user represented by items of writing information that have writing timing information after the specified writing timing; and
   changing an association of at least one of the plurality of items of writing information from the first document to a second document based on whether its writing timing information is before or after the specified writing time.

2. The non-transitory computer readable medium according to claim 1, wherein, in the displaying of an image, the image is displayed for each page, of the plurality of pages, at positions corresponding to writing positions within the page.

3. The non-transitory computer readable medium according to claim 1, wherein, in the changing of the association with a document, among the plurality of items of writing information corresponding to the displayed image, first writing information indicating a writing timing prior to the received writing timing and second writing information indicating a writing timing subsequent to the received writing timing are associated with different documents.

4. The non-transitory computer readable medium according to claim 3, wherein:
   in the displaying of an image, a guiding image representing sequential writing timings corresponding to the plurality of items of writing information in chronological order is also displayed; and
   in the receiving of a specified writing timing, a specified position within the guiding image is received.

5. The non-transitory computer readable medium according to claim 4, wherein, in the guiding image, a period for which writing is performed and a period for which writing is not performed are separately displayed.

6. The non-transitory computer readable medium according to claim 5, wherein, in the displaying of an image, an image for instructing a user to specify the longest period among a plurality of the periods for which writing is not performed is displayed.

7. The non-transitory computer readable medium according to claim 3, the process further comprising:
   determining the first writing information and the second writing information in accordance with a positional relationship between the first writing information and the second writing information within the one page,
   wherein, in the receiving of a specified writing timing, the determined first writing information and the determined second writing information are separately displayed.

8. The non-transitory computer readable medium according to claim 3, wherein, in the receiving of a specified writing timing, a newly specified association between the first writing information or the second writing information and a page, of the plurality of pages, is received.

9. An information processing apparatus comprising:
   a processor programmed to obtain a plurality of items of writing information associated with a first document, of a plurality of documents, each item of writing information representing handwriting of a user and including writing position information and writing timing information, and each item of writing information being associated with one page, of a plurality of pages, of one document, of the plurality of documents; and
   a display that displays: (i) a screen including a representation of the plurality of documents and respective pages of the plurality of documents; and (ii) an image including representations of all of the handwriting of the user represented by the plurality of items of writing information associated with the one page,
   wherein when the item of writing information on a first page of the plurality of pages is selected and dragged to a second page of the plurality of pages, the selected items of writing information is moved from the first page to the second page, both the first page and the second page being simultaneously visible within the screen;
   wherein the processor is further programmed to:
   receive a specified writing timing, the specified writing timing being a specific time;
   update the displayed image to display the representations of the handwriting of the user represented by items of writing information that have writing timing information before the specified writing timing differently than the representations of the handwriting of the user represented by items of writing information that have writing timing information after the specified writing timing; and
   change an association of at least one of the plurality of items of writing information from the first document to a second document based on whether its writing timing information is before or after the specified writing time.

10. A writing system comprising:
    a sheet on which an image indicating position information is formed;
    a processor programmed to receive a plurality of items of writing information associated with a first document, of a plurality of documents, each item of writing information representing handwriting of a user and, and each item of writing information being associated with one page, of a plurality of pages, of one document, of a plurality of documents, and indicating a writing position on the sheet and a writing timing; and a display that displays: (i) a screen including a representation of the plurality of documents and respective pages of the plurality of documents; and (ii) an image associated with a first document, of a plurality of documents, each item of writing information representing handwriting of a user and the plurality of items of writing information associated with the one page, wherein when the item of writing information on a first page of the plurality of pages is selected and dragged to a second page of the plurality of pages, the selected items of writing information is moved from the first page to the second page, both the first page and the second page being simultaneously visible within the screen;

wherein the processor is further programmed to:
  receive a specified writing timing, the specified writing timing being a specific time;
  update the displayed image to display the representations of the handwriting of the user represented by items of writing information that have writing timing information before the specified writing timing differently than the representations of the handwriting of the user represented by items of writing information that have writing timing information after the specified writing timing; and
  change an association of at least one of the plurality of items of writing information from the first document to a second document based on whether its writing timing information is before or after the specified writing time.

* * * * *